US005533927A

United States Patent [19]
Schill

[11] Patent Number: 5,533,927
[45] Date of Patent: Jul. 9, 1996

[54] SKINNING AND TRIMMING MACHINE

[76] Inventor: Alfred Schill, Merkurstrasse 8, 77694 Kehl, Germany

[21] Appl. No.: 167,972

[22] PCT Filed: Jun. 26, 1992

[86] PCT No.: PCT/DE92/00532

§ 371 Date: Dec. 27, 1993

§ 102(e) Date: Dec. 27, 1993

[87] PCT Pub. No.: WO93/00014

PCT Pub. Date: Jan. 7, 1993

[30] Foreign Application Priority Data

Jun. 27, 1991 [DE] Germany ............................ 41 21 282.7

[51] Int. Cl.⁶ ...................................................... A22B 5/16
[52] U.S. Cl. ................................................................ 452/127
[58] Field of Search ...................................... 452/127, 125

[56] References Cited

U.S. PATENT DOCUMENTS 4,338,704  7/1982  Welton et al. ........................... 452/127

FOREIGN PATENT DOCUMENTS

| 2086688 | 12/1971 | France . | |
|---|---|---|---|
| 2427789 | 4/1980 | France . | |
| 2451253 | 10/1980 | France | 452/128 |
| 3409933 | 9/1985 | Germany | 452/127 |

*Primary Examiner*—Willis Little
*Attorney, Agent, or Firm*—Edwin E. Greigg; Ronald E. Greigg

[57]  ABSTRACT

A skinning and trimming machine having a roller system comprised of three rollers, namely a traction roller, a stripping roller driven in the same direction of rotation and a cleaning roller that, like the traction roller, has a toothed surface that meshes with that of the traction roller, and in which annular grooves engaged by the teeth of a cleaning comb are disposed on the surface of this cleaning roller.

15 Claims, 2 Drawing Sheets

SKINNING AND TRIMMING MACHINE

The invention is based on a skinning and trimming machine as defined hereinafter. In a known, generic skinning and trimming machine (German Published, Non-Examined Patent Publication DE-OS 38 37 181), good skinning is attained by means of the cooperation of the surface toothing of the traction roller, the cutting blade or the blade bar disposed with specific spacing of its hollow surface. In this known machine annular grooves disposed on the traction roller are engaged by teeth of a cleaning comb for cleaning the surface of the traction roller. Because of this design, the toothed surface is thus reduced by the surface area required by the annular grooves. Correspondingly, the efficiency during skinning is decreased, because the traction roller essentially assumes the feed function during skinning. While the cleaning comb in this machine essentially removes pieces of skin and tissue from the surface of the traction roller, a cleaning roller whose toothing corresponds to that of the traction roller acts to clean fat and less securely attached pieces. The two toothings engage so that particles present in the longitudinal toothing of the surface of the traction roller are squeezed out, particularly into the annular grooves, as with a mangle. The cleaning roller is disposed downstream of the cleaning comb in the direction of rotation of the traction roller. Although the cleaning comb removes the essential pieces of skin, with many types of meat the meshing of the traction roller and cleaning roller toothings causes the formation of fat and tissue coatings that are pressed firmly onto the surface of the cleaning roller and impair the cleaning function of the traction roller.

In another known skinning device (French Patent Disclosure FR 70 12 414) a stripping roller whose surface is likewise toothed cooperates with the traction roller. The toothing of this stripping roller does not engage the toothing of the traction roller, and the traction roller and stripping roller have the same direction of rotation, so that a high relative speed results on the surfaces of the traction roller and stripping roller, which are located opposite and close to one another. The stripping roller carries off the separated pieces of skin and tissue to an adequate extent. However, fat and fine-particle materials cannot be removed by this means; hence, a fan is additionally used to blow away such pieces from the surface of the traction roller that result in all of the accompanying disadvantages.

ADVANTAGES OF THE INVENTION

In contrast, the skinning and trimming machine of the invention having has the advantage that the entire surface of the traction roller is available for the task of skinning because annular grooves are no longer necessary. By means of the arrangement known per se of the stripping roller, the connected pieces such as pieces of skin and tissue are removed from the surface of the traction roller. The toothing of the downstream cleaning roller then engages the toothing of the traction roller surface and presses out fat pieces and fine particles there. Coatings forming there are removed from the surface of the cleaning roller by means of the cleaning comb engaging this surface, so this cleaning roller, with extensively cleaned teeth, engages the unclean traction roller. The annular grooves only cause an insignificant decrease in the cleaning effectiveness of the cleaning roller. The overall efficiency of the skinning and trimming machine of the invention is significantly improved in comparison to the known machines.

In accordance with an advantageous embodiment of the invention, the sharp-edged beads on the surface of the stripping roller extend in a screwlike manner. A screw-shaped arrangement of this type is known per se from the above-mentioned machine (FR-PS 70 12 414). The slightly screw-shaped course facilitates the removal of skin from the traction roller, because skinning begins on one side of the roller, and then extends along the length of the roller.

In accordance with a further advantageous embodiment of the invention, the sharp-edged beads on the stripping roller have a sawtooth-shaped cross-section with a front edge pointing in the direction of rotation, a short, tangential radial edge and a rear edge extending flat and ending radially inwardly at the following front edge. This sawtooth-shaped embodiment, in connection with the slight distance of the tangential radial edge section of these beads to the surface or to the toothing of the traction roller, prevents the pieces of skin and tissue to be removed by the traction roller from moving between the two rollers. The stripping roller can preferably run at a higher rpm than the traction roller in a way known per se (FR-PS 70 12 414).

In accordance with a further advantageous embodiment of the invention, the cleaning roller and/or the cleaning comb can be displaceable and/or outwardly pivotable to be able to better clean the machine. Thus it is possible in accordance with the invention to dispose the cleaning roller and/or the cleaning comb on a table-supported device that is pivotable with the tabletop, because of which the cleaning roller is separated from the traction roller in the outwardly-pivoted position of the table-supported device. The table-supported device is seated with its pivoting arrangement on the machine housing in a known way (DE-OS 38 37 181).

In accordance with an advantageous embodiment of the invention, the tabletop can be pulled back or out counter to the meat transport direction in order to approach the rollers from above. In a way known per se, the blade bar with cutting blades can likewise be disposed on a pivoting device that is likewise seated on the machine housing or, also correspondingly, the traction roller or the stripping roller.

In accordance with a further advantageous embodiment of the invention, the cleaning comb is pivotable, in a way known per se, relative to the cleaning roller for its engagement or disengagement, and the pivot bearing is disposed on the table-supported device. In accordance with the invention, the outward pivoting of the cleaning comb can also be effected independently of the pivoting of the tabletop. Good accessibility is attained because the cleaning comb can be disposed on the side of the cleaning roller facing away from the traction roller because of the direction of rotation of the cleaning roller (which is opposed to that of the traction roller); in any case, the accessibility is better than with the known skinning machine (DE-OS 38 37 181).

Further objects and advantages and advantageous embodiments of the invention ensue from the following description of the drawings and from the claims.

DRAWINGS

An exemplary embodiment of the subject of the invention is shown in the drawings and described in detail below. Shown are in:

Figure 1:
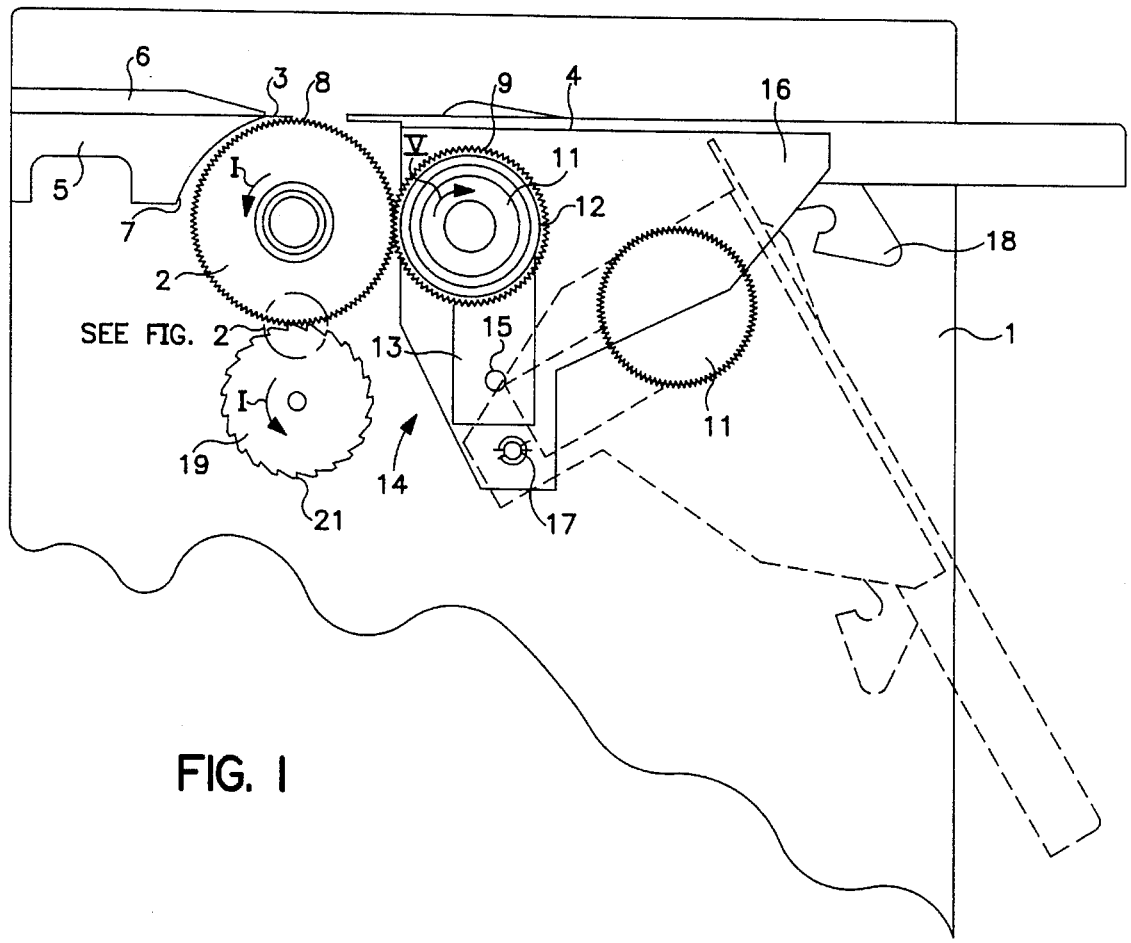
FIG. 1 illustrates a simplified side view of the essential machine parts, with the omission of the side wall.

In the skinning and trimming machine shown in FIG. 1 in a very simplified manner and only with the essential parts, a traction roller 2 is seated in a housing 1, is driven in the direction of rotation I by means that are not shown, and cooperates with a cutting blade 3 to skin or trim meat fed manually across a tabletop 4, in the direction of the cutting blade 3. The cutting blade 3 is securely clamped to a blade bar 5 by means of a holding strap 6. The blade bar 5 has a barrel-shaped hollow surface 7 oriented toward the traction roller 2, wherein this distance between the hollow surface 7 and the surface of the traction roller 2 is of significance for transporting the skin pulled off of the meat. However, the toothing 8 disposed on the surface of the traction roller 2 is crucial for skinning; by means of this toothing, and because of the direction of rotation I of the traction roller, the skins or tendons and hide are fed past the cutting blade 3. The edges of the teeth of this toothing 8 extending across the length of the traction roller 2 have a graduated surface, and are relatively steep.

Figure 3:
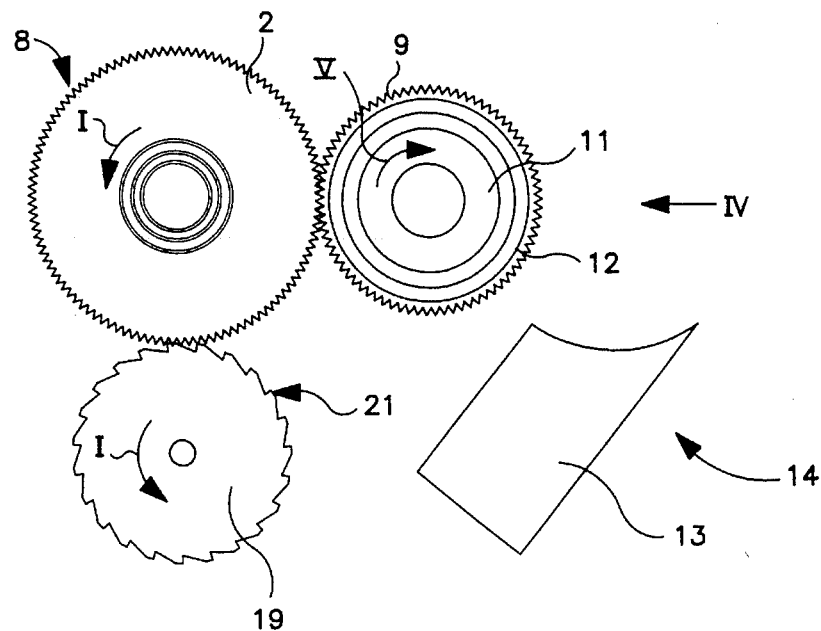
FIG. 3 illustrates the roller mechanism in accordance with view III in FIG. IV.

A toothing 9 on the surface of a cleaning roller 11 meshes with this toothing of the traction roller 2. This toothing likewise extends along the length of the cleaning roller 11, but is interrupted by annular grooves 12 engaged by the teeth 13 of a cleaning comb 14. In this way material that has been transferred from the traction roller 2 onto the cleaning roller 11 and compressed there is combed out, because when the toothings 8 and 9 engage, such material is forced to a great extent into the annular grooves. The cleaning comb 14 is seated on a shaft 15 and can be pivoted outwardly, as shown in FIG. 3. The shaft 15 is in turn disposed on a table-supported device 16 seated in the housing 1, on which the tabletop 4 is disposed and the cleaning roller 11 is seated, and can be pivoted around a shaft 17 seated in the housing 1, for example into the outwardly-pivoted position shown in dot-dash lines in FIG. 1. In this outwardly-pivoted position the traction roller 2 and cleaning roller 11 are easily accessible for cleaning of the machine, for example. The table-supported device 16 is held in the respective pivoted position by means of a bar 18.

Figure 2:
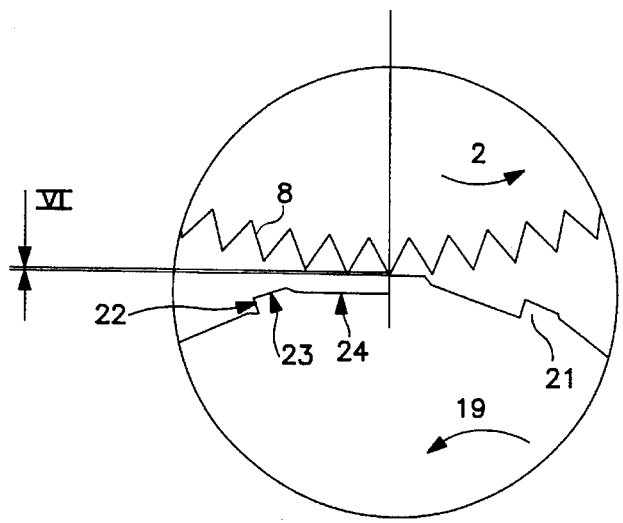
FIG. 2 illustrates an enlargement of the section II from FIG. 1.

Furthermore, a stripping roller 19 driven in the same direction of rotation I as the traction roller 2, and preferably at a higher rpm, is seated in the housing 1. On its surface this stripping roller 19 has sharp-edged beads 21 with a sawtooth-shaped cross-section, as shown in FIG. 2 on an enlarged scale in accordance with the section II from FIG. 1. Moreover, these sawtooth-shaped beads extend in screwlike fashion along the length of the stripping roller 19, as can be taken from FIG. 4.

The sawtooth-shaped beads 21 respectively have a steep, almost radially extending front edge 22, a short, tangential radial edge 23 and a rear side edge 24 extending less steeply. The bead has a gently rounded transition between the radial edge 23 and the rear edge 24. The distance VI between the toothing 8 of the traction roller 2 and the sawtooth beads 21 of the stripping roller 19 is only very small so that the skins and tendons can be removed from the traction roller 2 by the stripping roller 19, in connection with its steep front edge 22.

FIG. 3 shows the three-roller system, with the traction roller 2, the cleaning roller 11 and stripping roller 19, on an enlarged scale with respect to FIG. 1 and by itself. This view corresponds to the view III in FIG. 4. Furthermore, in this case the cleaning comb 14 is shown with its teeth 13 in the outwardly-pivoted state.

Figure 4:
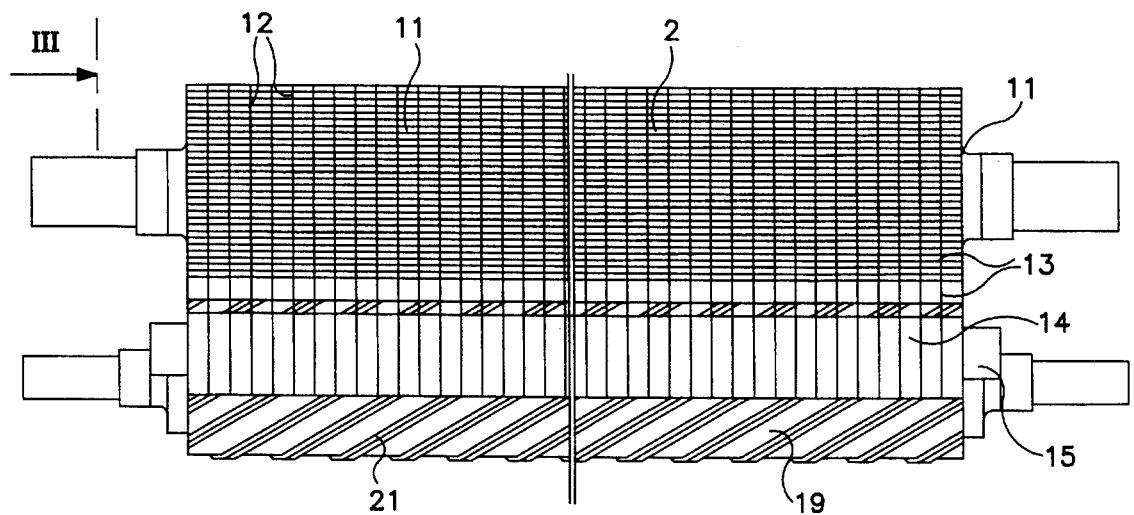
FIG. 4: roller mechanism in accordance with view V in FIG. 3.

FIG. 4 shows the roller system in a side view, in accordance with view IV in FIG. 3. The traction roller 2 is extensively hidden by the cleaning roller 11, so that only the upper region can be seen. The annular grooves 12 engaged by the teeth 13 of the cleaning comb 14 are disposed distributed along the entire length of the cleaning roller 11, and are clearly visible in the cleaning roller 11. For better visibility, the teeth 13 are shown as thicker lines. The stripping roller 19 is also partially hidden, in this case by the shaft 15 of the cleaning comb 14. The sawtooth-shaped beads 21 extending in screwlike fashion are visible on the stripping rollers 19.

All of the features represented in the description, the following claims and the drawings can be essential to the invention either individually or in arbitrary combination with one another.

I claim:

1. A meat skinning and trimming machine having a tabletop (4) supported by a machine housing (1) for feeding the meat to be skinned, a traction roller (2) associated with the tabletop (4), whose surface has a longitudinal toothing (8) extending crosswise to the running direction (I) of the roller for transporting the meat; a cutting blade (3) extending tangentially to the traction roller (2) and oriented opposite the meat transport direction; a blade bar (5) supporting the cutting blade (3) and having a hollow surface (7) associated with the traction roller surface at a specific distance therefrom that serves to guide the skin transport; a cleaning roller (11) whose surface has a longitudinal toothing (9) that corresponds to the toothing (8) of the traction roller and that meshes with the toothing of the traction roller (2); annular grooves (12) provided on the surface of the roller (11); a cleaning comb (14) honing teeth (13) engage said annular grooves to clean the cleaning roller surface and; a stripping roller (19) disposed parallel to the traction roller (2) and cooperating with said traction roller, and having the same direction (I) of rotation as said transaction roller, said stripping roller being positioned near the traction roller (2), honing sharp-edged beads provided on the surface thereon, said sharp-edged beads (21) having a sawtooth-shaped cross-section with a steep front edge pointing in the direction (I) of rotation, a short tangential radial edge, and a read edge extending less steeply.

2. The meat skinning and trimming machine as defined by claim 1, in which the sharp-edged beads (21) extend in a slightly screwlike fashion on the surface of the stripping roller (19).

3. The meat skinning and trimming machine as defined by claim 2, in which the cleaning roller (11) can be displaced or pivoted outwardly via a device and hence separated from the traction roller (2).

4. The meat skinning and trimming machine as defined by claim 2, in which the cleaning comb (14) can be displaced or pivoted relative to the cleaning roller (11) for its engagement or disengagement.

5. The meat skinning and trimming machine as defined by claim 2, in which the cleaning roller (11) and the cleaning comb (14) are disposed on a table-supported device (16) that can be pivoted with the tabletop (4), because of which cleaning roller (11) can be separated from the traction roller (2) in the outwardly-pivoted position.

6. The meat skinning and trimming machine as defined by claim 2, in which the sharp-edged beads (21) on the surface of the stripping roller (19) have a sawtooth-shaped cross-section with a steep front edge pointing in the direction (I) of rotation, a short, tangential radial edge and a rear edge extending less steeply.

7. The meat skinning and trimming machine as defined by claim 6, in which the cleaning roller (11) can be displaced or pivoted outwardly via a device and hence separated from the traction roller (2).

8. The meat skinning and trimming machine as defined by claim 1, in which the cleaning roller (11) can be displaced or pivoted outwardly via a device and hence separated from the traction roller (2).

9. The meat skinning and trimming machine as defined by claim 8, in which the cleaning comb (14) can be displaced or pivoted relative to the cleaning roller (11) for its engagement or disengagement.

10. The meat skinning and trimming machine as defined by claim 8, in which the cleaning roller (11) and the cleaning comb (14) are disposed on a table-supported device (16) that can be pivoted with the tabletop (4), because of which the cleaning roller (11) can be separated from the traction roller (2) in the outwardly-pivoted position.

11. The meat skinning and trimming machine as defined by claim 1, in which the cleaning comb (14) can be displaced or pivoted relative to the cleaning roller (11) for its engagement or disengagement.

12. The meat skinning and trimming machine as defined by claim 11, in which the cleaning roller (11) and the cleaning comb (14) are disposed on a table-supported device (16) that can be pivoted with the tabletop (4), because of which the cleaning roller (11) can be separated from the traction roller (2) in the outwardly-pivoted position.

13. The meat skinning and trimming machine as defined by claim 1, in which the cleaning roller (11) and the cleaning comb (14) are disposed on a table-supported device (16) that can be pivoted with the tabletop (4), because of which the cleaning roller (11) can be separated from the traction roller (2) in the outwardly-pivoted position.

14. The meat skinning and trimming machine as defined by claim 13, in which the pivot bearing (15) is disposed on the table-supported device (16).

15. The meat skinning and trimming machine as defined by claim 1, in which the tabletop (4) can be pulled back or out counter to the meat transport direction.

\* \* \* \* \*